United States Patent
Lee et al.

(10) Patent No.: US 11,270,181 B2
(45) Date of Patent: Mar. 8, 2022

(54) SMART CARD

(71) Applicant: KONA I CO., LTD., Seoul (KR)

(72) Inventors: Seung Gie Lee, Incheon (KR); Chung Kil Kim, Seoul (KR); Yung Hwan Kim, Seoul (KR)

(73) Assignee: KONA I CO., LTD., Seoul (KR)

( * ) Notice: Subject to any disclaimer, the term of this patent is extended or adjusted under 35 U.S.C. 154(b) by 0 days.

(21) Appl. No.: 16/994,766

(22) Filed: Aug. 17, 2020

(65) Prior Publication Data

US 2021/0406633 A1 Dec. 30, 2021

(30) Foreign Application Priority Data

Jun. 24, 2020 (KR) .................... 10-2020-0076878

(51) Int. Cl.
*G06K 19/07* (2006.01)
*G06K 19/077* (2006.01)

(52) U.S. Cl.
CPC ..... *G06K 19/0724* (2013.01); *G06K 19/0718* (2013.01); *G06K 19/07767* (2013.01)

(58) Field of Classification Search
CPC ........... G06K 19/0701; G06K 19/0702; G06K 19/0707; G06K 19/0709; G06K 19/0715; G06K 19/0716; G06K 19/0718; G06K 19/0723; G06K 19/0724; G06K 19/07345; G06K 19/07749; G06K 19/0775; G06K 19/07766
See application file for complete search history.

(56) References Cited

U.S. PATENT DOCUMENTS

| | | | | |
|---|---|---|---|---|
| 2008/0122401 A1* | 5/2008 | Sato | .................... | G06K 19/0701 320/107 |
| 2008/0210762 A1* | 9/2008 | Osada | .............. | G06K 19/07783 235/492 |
| 2015/0090798 A1* | 4/2015 | Pachler | .................. | B42D 25/23 235/492 |
| 2018/0268274 A1* | 9/2018 | Lowe | ................. | G06K 7/10158 |

FOREIGN PATENT DOCUMENTS

| | | |
|---|---|---|
| JP | 2008-181499 A | 8/2008 |
| JP | 2014-112853 A | 6/2014 |
| JP | 2020-509502 A | 3/2020 |

* cited by examiner

*Primary Examiner* — Thien M Le
*Assistant Examiner* — April A Taylor
(74) *Attorney, Agent, or Firm* — Novick, Kim & Lee, PLLC; Sang Ho Lee (57) ABSTRACT

Provided is a smart card that can prevent malfunction in the smart card and improve stability of radio frequency communication by removing interference of an AC signal generated at the antenna terminal of the smart card. The smart card includes: a dual antenna configured of a first antenna and a second antenna for performing radio frequency communication with a card reader; an IC chip electrically connected to the first antenna to perform radio frequency communication through the first antenna; a power generation unit for generating DC power by converting a radio frequency signal received through the second antenna; a control unit for receiving the DC power generated from the power generation unit to control various modules; and a cut-off unit arranged between the first antenna and the IC chip to cut off a radio frequency signal received through the first antenna under the control of the control unit.

7 Claims, 5 Drawing Sheets

SMART CARD

CROSS-REFERENCE TO RELATED APPLICATIONS

This application claims priority to Korean Patent Application No. 10-2020-0076878, filed on Jun. 24, 2020, the disclosure of which is incorporated herein by reference in its entirety.

BACKGROUND OF THE INVENTION

Field of the Invention

The present invention relates to a smart card, and more particularly, to a method of activating and deactivating a smart card by controlling an antenna terminal of the smart card.

In addition, the present invention relates to a smart card, which prevents malfunction of the smart card, and improves stability of radio frequency communication by removing interference of an AC signal generated at the antenna terminal of the smart card.

Background of the Related Art

Generally, a smart card is called an NFC card, an IC card, or the like, and the smart card is classified as a contact card or a contactless card according to the method of communicating with a card reader. The contact card means a card that can communicate with the card reader by touching a gold-plated contact surface on the card reader, and the contactless card means a card that can communicate with the card reader in a radio frequency method using a wireless antenna embedded in the card. In addition, there are combi cards and hybrid cards in which both contact and contactless cards are combined.

A card reader recognizes a contactless card, in particular, a smart card, located at a short distance using a radio frequency signal. The card reader and the smart card may exchange information through radio frequency signals. In the smart card, supply of power for driving an integrated circuit chip (IC chip) in the card is made through electronic coupling of a wireless antenna, and the smart card uses an electromagnetic induction method to communicate with a card reader. That is, when the smart card approaches the card reader, an induction electromotive force is generated at the wireless antenna, and the card reader may read information. Accordingly, since the contactless smart card has no direct contact with the external environment it is robust, and since the contactless smart card operates only by approaching within a predetermined distance with no need for being inserted into or contacting the card reader, convenience and utilization of using the card are excellent.

A conventional structure proposed for the power supply function and information exchange of a smart card will be described.

Figure 1:
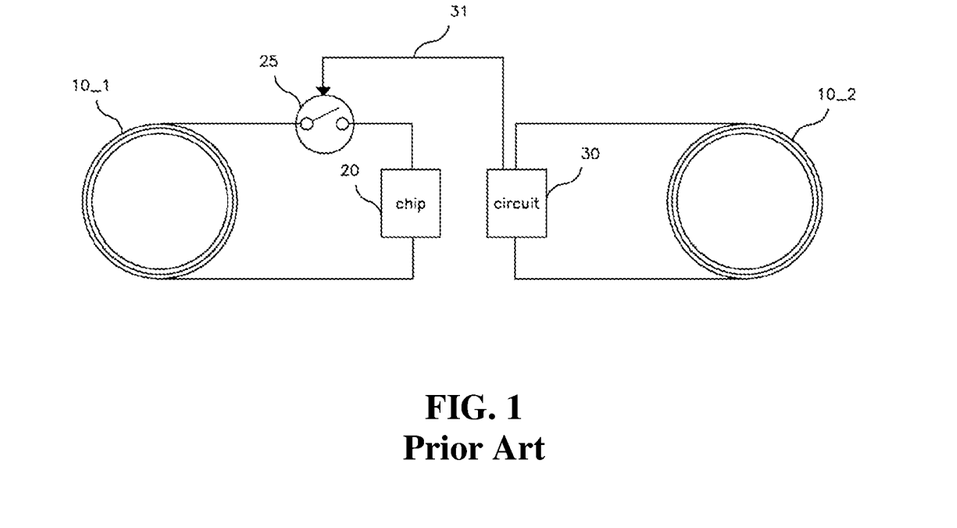
FIGS. 1 and 2 are views showing the structure of a conventional smart card including an electronic card.
Figure 2:
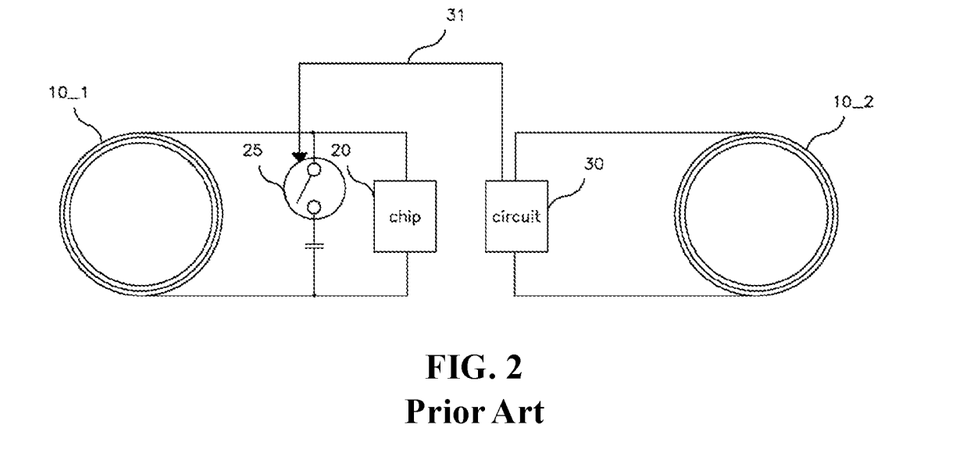

FIGS. 1 and 2 are views showing the structure of a conventional smart card including an electronic card.

Referring to FIGS. 1 and 2, as a conventional smart card having a general electronic circuit embedded therein, a general circuit 30 for supporting a specific application function is added to a smart card chip 20, and the smart card chip 20 and the general circuit 30 are supplied with power through antennas 10_1 and 10_2, and perform radio frequency communication with an external card reader.

At this point, the antenna 10_1 and the smart card chip 20 are electrically connected, and the electrical connection between the antenna 10_1 and the smart card chip 20 may be turned on and off through a switch 25. The switch 25 may be turned on and off by the control of the general circuit 30 connected through a connection line 31. FIG. 1 shows a case of connecting the switch 25 and the smart card chip 20 in series in the smart card, and FIG. 2 shows an example of connecting the switch 25 and the smart card chip 20 in parallel in the smart card.

Such a conventional smart card has a problem in that the general circuit 30 is damaged as the AC signal of a radio frequency received through the antenna 10_1 flows back through the connection line 31 while performing radio frequency communication with an external card reader. This damage causes a malfunction of the smart card.

SUMMARY OF THE INVENTION

Accordingly, the present invention has been made in view of the problems occurring in the prior art, and it is an object of the present invention to provide a smart card which prevents malfunction of the smart card including an electronic circuit and improves stability of radio frequency communication by removing interference of an AC signal generated at the antenna terminal of the smart card.

To accomplish the above object, according to an aspect of the present invention, there is provided a smart card comprising: a dual antenna configured of a first antenna and a second antenna for performing radio frequency communication with a card reader; an IC chip electrically connected to the first antenna to perform radio frequency communication through the first antenna; a power generation unit for generating DC power by converting a radio frequency signal received through the second antenna; a control unit for receiving the DC power generated from the power generation unit to control various modules; and a cut-off unit arranged between the first antenna and the IC chip to cut off a radio frequency signal received through the first antenna under the control of the control unit.

In addition, the cut-off unit may include: a rectifier for rectifying the radio frequency signal received through the first antenna; and a switch for connecting an output terminal of the rectifier to a ground according to a control signal of the control unit.

Here, when the control signal is provided at a low level indicating a deactivation state of the IC chip, the switch may be turned on.

On the contrary, when the control signal is provided at a high level indicating an activation state of the IC chip, the switch may be turned off. Accordingly, the radio frequency signal received through the first antenna may be provided to the IC chip, and the radio frequency signal provided to the cut-off unit may be rectified into DC power and cut off from the ground.

In addition, the smart card may further comprise: a built-in battery for storing the DC power generated by the power generation unit and supplying DC power required for operation of the various modules under the control of the control unit.

Here, the various modules may be one or more among a user interface, a display, a fingerprint recognition module, and a wireless power charging module.

In another embodiment, the cut-off unit may include: a rectifier for rectifying the radio frequency signal received through the first antenna and a switch connected to a capacitor to connect the radio frequency signal received through the first antenna to the ground through the capacitor under the control of the control unit, wherein the ground of the rectifier is commonly connected to the ground of the switch and the control unit.

| 110_1, 110_2: Dual antenna | 115: Power generation unit |
| 120: IC chip | 130: Control unit |
| 140, 240: Cut-off unit | 141, 241: Rectifier |
| 143, 243_1, 243_2: Switch | |

DETAILED DESCRIPTION OF THE PREFERRED EMBODIMENTS

Hereinafter, preferred embodiments of the present invention will be described in detail with reference to the accompanying drawings in order to clarify the technical spirit of the present invention. In describing the present invention, when it is determined that detailed descriptions of related well-known functions or components may unnecessarily obscure the subject matters of the present invention, detailed descriptions thereof will be omitted. In the drawings, elements having practically the same functional configuration are assigned the same reference numerals and symbols as possible although they are displayed in different drawings. For convenience of explanation, the device and the method are described together.

Hereinafter, preferred embodiments of the present invention will be described with reference to the accompanying drawings.

Figure 3:
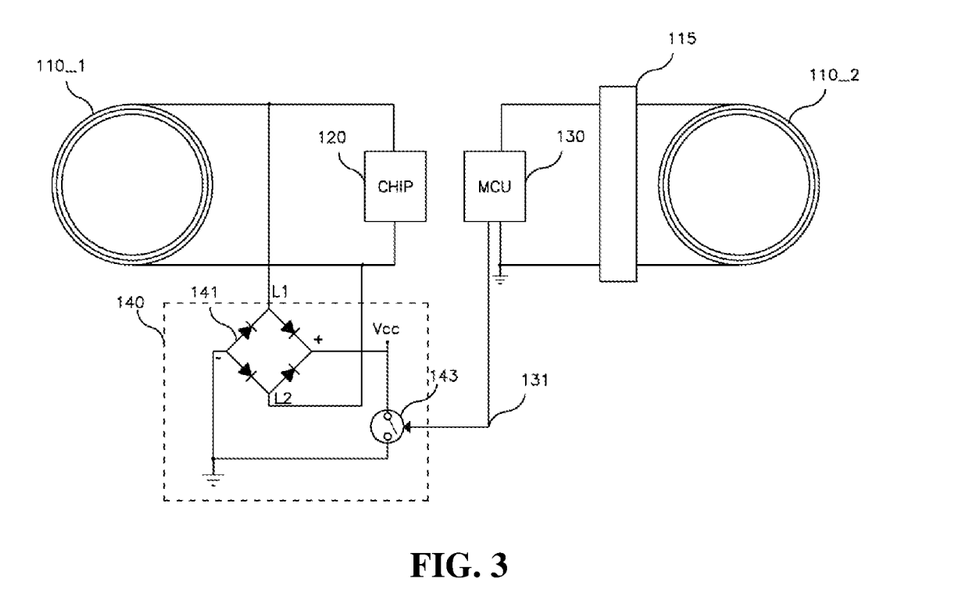
FIG. 3 is a view showing the structure of a smart card according to an embodiment of the present invention.
Figure 4:
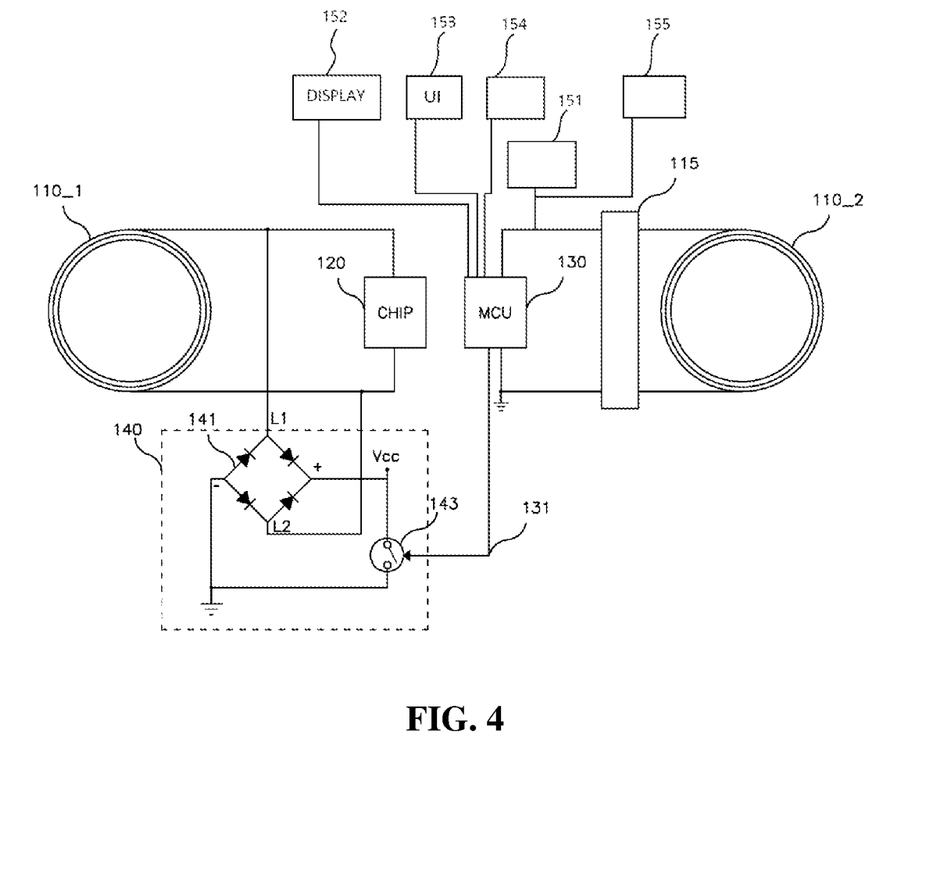
FIG. 4 is a view showing the structure of a smart card according to another embodiment of the present invention.

FIG. 3 is a view showing the structure of a smart card according to an embodiment of the present invention, and FIG. 4 is a view showing the structure of a smart card according to another embodiment of the present invention.

Referring to FIG. 3, the smart card may include a dual antenna 110_1 and 110_2 configured of a first antenna 110_1 and a second antenna 110_2, a power generation unit 115, an IC chip 120, a control unit 130, and a cut-off unit 140.

The dual antenna 110_1 and 110_2 may perform radio frequency communication with an external card reader. Here, the radio frequency communication is performed through a near field communication (NFC) module (not shown), which is a communication technique for exchanging various wireless data within a short distance less than 10 cm. Here, NFC is a next-generation short-range communication technique attracting attention as the security is relatively excellent owing to the short communication distance and low price. Accordingly, power supply and information exchange with the card reader through the radio frequency communication can be performed in a contactless manner using the dual antenna 110_1 and 110_2.

The first antenna 110_1 is electrically connected to the IC chip 120 and may perform radio frequency communication between the IC chip 120 and the card reader.

The second antenna 110_2 is ultimately electrically connected to the control unit 130 and may perform radio frequency communication with the control unit 130.

As the dual antenna 110_1 and 110_2 is configured to perform radio frequency communication between the IC chip 120 and the control unit 130 while they have a structure physically separated from each other, stability of the radio frequency communication between the card reader and the smart card is improved, and the smart card may have an effect of increasing the amount of power received from the card reader.

The power generation unit 115 may be disposed between the second antenna 110_2 and the control unit 130 to convert the radio frequency signal received through the second antenna 110_2 to generate and supply DC power. Since the radio frequency signal received through the second antenna 110_2 is an AC signal, it needs to convert the AC signal into DC power for operating the control unit 130.

Accordingly, the power generation unit 115 may convert the radio frequency signal that the second antenna 110_2 receives into DC power. The power generation unit 115 may be configured as a rectifying circuit using four diodes bridge-coupled by a full-wave rectifying method.

The IC chip 120 may be activated through a radio frequency signal received from the first antenna 110_1. The IC chip 120 may include a rectifier for rectifying a radio frequency signal received from the first antenna 110_1 into DC power, a microprocessor unit (MPU) having a calculation function of its own, a read only memory (ROM) which is a non-volatile memory for storing a chip operation system (COS), an electrically erasable programmable read only memory (EEPROM) which is a non-volatile memory for storing an application program and its data, a random access memory (RAM) which is a volatile memory for temporarily storing data including various variables, and an input and output interface for exchanging data with the outside of the IC chip 120.

In addition, the IC chip 120 may be implemented to further include a secure element. Here, the secure element may include a universal integrated circuit card (UICC), an embedded SE (eSE), and a micro SD. In addition, since the secure element has its own encryption system and is provided to be separate from the control unit 130, it is robust to hacking or the like and thus is highly secure. Accordingly, information that requires high security may be stored in the secure element.

The control unit 130 is an electronic circuit and may include a microcontroller unit (MCU) in the form of a printed circuit or a chip. It may receive DC power from the power generation unit 115 to operate.

Accordingly, the control unit 130 may control the overall operation of the smart card. That is, the control unit 130 may control operation of various application modules added to the smart card.

Referring to FIG. 4, For example, when the smart card additionally configures a display 152 that supports a balance display function, the control unit 130 may be configured to control a function for operating the display 152 through data exchange with the IC chip 120.

In addition, the control unit 130 may output a control signal to the cut-off unit 140 to deactivate the IC chip 120.

For example, when wireless power charging of the smart card is performed through a wireless power charging device, the control unit 130 may output a control signal so that the cut-off unit 140 is turned on to deactivate the IC chip 120. As the wireless power charging (WPC) uses a frequency of high frequency domain unlike data communication, there is a possibility that the IC chip 120 may be damaged by the effect of a radio frequency signal. Accordingly, the control unit 130 prevents such damage by deactivating the IC chip 120.

As another example, when the smart card additionally configures a fingerprint recognition module 154, which is a security module, the control unit 130 may output a control signal for turning on the cut-off unit 140 to deactivate the IC chip 120 when a fingerprint does not match.

The cut-off unit 140 may be disposed between the first antenna 110_1 and the IC chip 120 to cut off radio frequency signals received through the first antenna 110_1 under the control of the control unit 130. The cut-off unit 140 may include a rectifier 141 and a switch 143.

The rectifier 141 may rectify a radio frequency signal received through the first antenna 110_1 into DC power. The rectifier 141 may be configured of a full-wave rectifying circuit, in which four diodes are connected in the form of a bridge. Accordingly, the AC signal received at both ends L1/L2 of the rectifier 141 can be output as full-wave rectified DC power.

Accordingly, the rectifier 141 may supply rectified DC power to the switch 143 by rectifying a radio frequency signal received through the first antenna 110_1 without regard to the radio frequency signal provided to the IC chip 120.

The switch 143 may connect the output terminal of the rectifier 141 to the ground according to a control signal of the control unit 130. That is, the switch 143 performs a turn-on or turn-off operation according to a control signal to connect or disconnect the output terminal of the rectifier 141 to or from the ground.

Accordingly, the cut-off unit 140 may cut off or connect the radio frequency signal.

Here, when the control signal provided through the connection line 131, which connects the control unit 130 and the switch 143, is provided at a low level L indicating a deactivation state of the IC chip 120, the switch 143 is turned on. Accordingly, the output terminal of the rectifier 141 is connected to the ground, and the rectified DC power flows into the ground. As a result, the radio frequency signal received through the first antenna 110_1 is cut off as it is rectified into DC power and connected to the ground by the cut-off unit 140.

On the other hand, when the control signal is provided at a high level (H) indicating an activation state of the IC chip 120, the switch 143 is turned off. Accordingly, the output terminal of the rectifier 141 is cut off from the ground. As a result, the radio frequency signal received through the first antenna 110_1 is provided to the IC chip 120 to perform radio frequency communication, and the radio frequency signal provided to the cut-off unit 140 is cut off from the ground while being rectified into DC power.

Accordingly, the problem of flowing AC signal into the control unit 130 through the connection line 131 is solved. That is, as the received radio frequency signal is rectified into DC power by the cut-off unit 140, it does not affect the control unit 130 and does not generate any interference in operation of the IC chip 120.

The smart card may further include a built-in battery 151. The built-in battery 151 may store DC power generated by the power generation unit 115 and supply DC power required for operation of various modules under the control of the control unit 130. That is, the built-in battery 151 may supply driving power to each of the IC chip 120, the display 152, the fingerprint recognition module 154 and the like. The built-in battery 151 may be installed in the smart card 120 or embedded in the form of a paper battery to operate the components driven by an electrical signal, such as the display 152, the fingerprint recognition module 154 and the like. At this point, the built-in battery 151 may be configured as a separate thin-film wireless power charging module 155 or may be embedded in the form of a clock generator or a flexible printed circuit board (FPCB).

The smart card may further include a user interface 153. The user interface 153 may receive input data for a user to select a function of the smart card. The user interface 153 may provide the input data to the control unit 130. The user interface 153 may include a keyboard, a key pad, a touch pad, a dome switch and the like. In particular, the touch pad may be generally used as a touch screen.

In addition, the smart card may further include a display 152. The display 152 may display card information and various kinds of selection information to the user. That is, the display 152 may display information processed by the smart card. The display 152 may be configured of an E-paper, an organic light emitting diode (OLED), a flexible display, a liquid crystal display (LCD), a thin film transistor liquid crystal display (TFT LCD) or the like.

In addition, the smart card may further include a fingerprint recognition module 154. The fingerprint recognition module 154 may include a fingerprint sensor and a storage unit. One side of the fingerprint sensor is exposed to the surface of the smart card to recognize a fingerprint, and information on the recognized fingerprint may be stored in the storage unit. At this point, only the fingerprint of a user's finger or fingerprints of a plurality of fingers may be stored as information on the recognized fingerprint. The operation of comparing information on the fingerprint recognized through the fingerprint sensor and the information on the fingerprints previously stored in the storage unit and activating the IC chip 120 may be implemented through the control unit 130.

Figure 5:
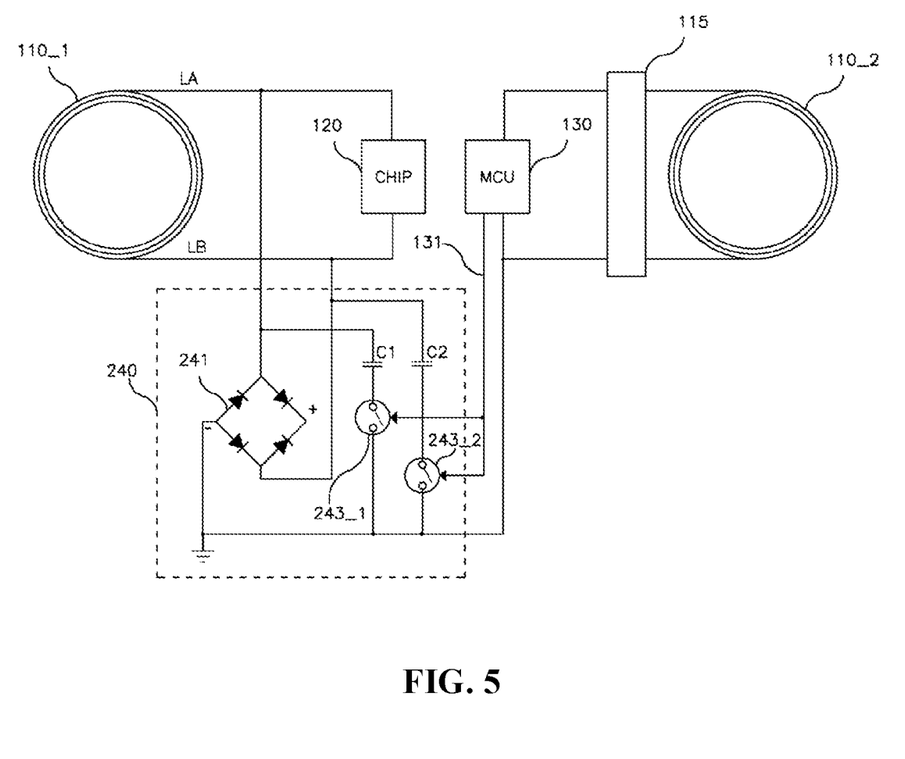
FIG. 5 is a view showing the structure of a smart card according to another embodiment of the present invention.
Figure 6:
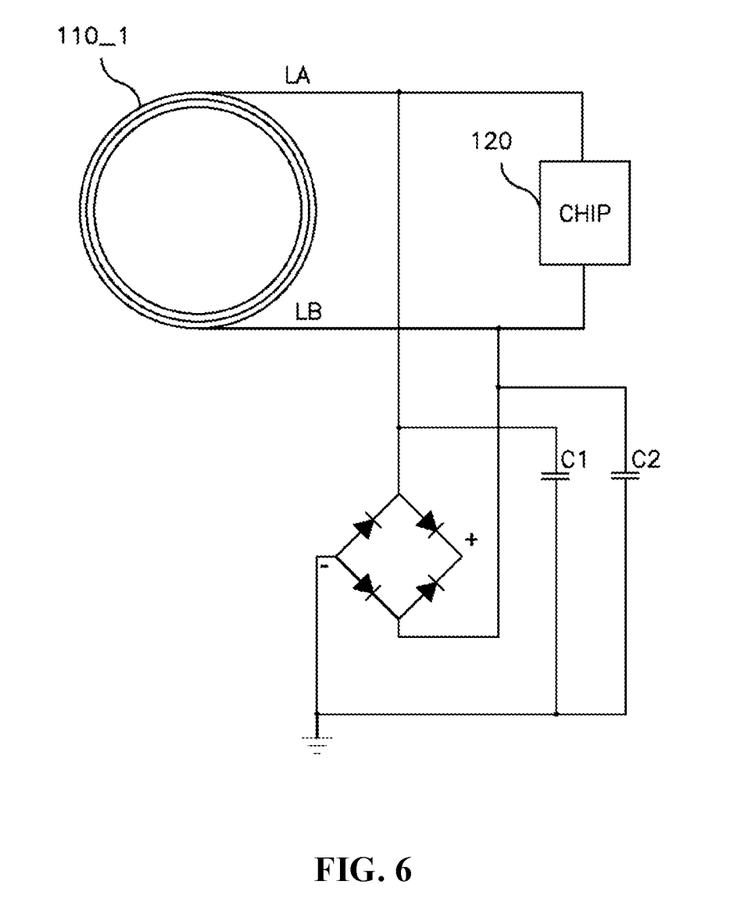
FIG. 6 is a view briefly showing the operation of a cut-off unit in the switching state of FIG. 5.

FIG. 5 is a view showing the structure of a smart card according to another embodiment of the present invention, and FIG. 6 is a view briefly showing the operation of a cut-off unit in the switching state of FIG. 5.

Referring to FIG. 5, the smart card may include a dual antenna 110_1 and 110_2 configured of a first antenna 110_1 and a second antenna 110_2, a power generation unit 115, an IC chip 120, a control unit 130, and a cut-off unit 240. Since description of the reference numerals are the same as those shown in FIG. 3, details thereof will be omitted.

The cut-off unit 240 may be disposed between the first antenna 110_1 and the IC chip 120 and cut off radio frequency signals received through the first antenna 110_1 under the control of the control unit 130.

The cut-off unit 240 may include a rectifier 241 and switches 243_1 and 243_2, respectively, connected to capacitors C1 and C2 in series.

The rectifier 241 may rectify a radio frequency signal received through the first antenna 110_1 into DC power. The rectifier 241 may be configured of a full-wave rectifying circuit, in which four diodes are connected in the form of a bridge. It may be implemented to commonly connect the ground of the rectifier 241 to the ground of the switches 243_1 and 243_2, and the physically separated control unit 130.

The switch 243_1 connected to the capacitor C1 in series at one end LA of the first antenna 110_1 and the switch 243_2 connected to the capacitor C2 in series at the other end LB of the first antenna 110_1 may connect the radio frequency signals passing through the capacitors C1 and C2 to the ground according to a control signal of the control unit 130. That is, the switches 243_1 and 243_2 may perform a turn-on or turn-off operation according to a control signal to connect the radio frequency signals passing through the capacitors C1 and C2 to the ground or cut off the radio frequency signals.

Accordingly, the cut-off unit 240 may cut off or connect the radio frequency signals. Here, when the control signal provided through the connection line 131, which connects the control unit 130 and the switches 243_1 and 243_2, is provided at a low level (L) indicating a deactivation state of the IC chip 120, the switches 243_1 and 243_2 are turned on.

Accordingly, as shown in FIG. 5, the radio frequency signals passing through the capacitors C1 and C2 flow into the ground. As a result, the radio frequency signal received through the first antenna 110_1 is cut off by attenuation of the frequency and connected to the ground by the cut-off unit 240.

On the other hand, when the control signal is provided at a high level (H) indicating an activation state of the IC chip 120, the switches 243_1 and 243_2 are turned off. Accordingly, the radio frequency signals passing through the capacitors C1 and C2 are disconnected from the ground.

As a result, the radio frequency signal received through the first antenna 110_1 is provided to the IC chip 120 to perform radio frequency communication, and the radio frequency signal provided to the cut-off unit 240 is cut off from the ground while the radio frequency signal is rectified into DC power or the frequency is attenuated by the capacitors C1 and C2.

Accordingly, the problem of flowing the AC signal back into the control unit 130 through the connection line 131 is solved. That is, as the received radio frequency signal is rectified into DC power or the frequency is attenuated by the cut-off unit 240, it does not affect the control unit 130, and it does not generate any interference in operation of the IC chip 120.

As a result, it is possible to perform activation and deactivation of the smart card without an error by effectively controlling the antenna terminal, and prevent malfunction in the smart card and improve stability of radio frequency communication by eliminating interference of an AC signal flowing back into the electronic circuit.

The smart card according to the present invention as described above may perform activation and deactivation of the smart card without an error by effectively controlling the antenna terminal, and prevent malfunction in the smart card and improve stability of radio frequency communication by eliminating interference of an AC signal flowing back into the electronic circuit.

The present invention has been described in detail focusing on the preferred embodiments shown in the drawings. These embodiments are not intended to limit the present invention, but are merely illustrative, and should be considered from an explanatory point of view rather than a restrictive point of view. The true technical scope of the present invention should be defined by the technical spirit of the appended claims rather than the description given above. Although specific terms are used in this specification, they are used only for the purpose of explaining the concept of the present invention and are not used to limit the meaning or the scope of the present invention defined in the claims. Each step of the present invention does not necessarily need to be performed in the described order, and may be performed in parallel, selectively or individually. A person skilled in the art would understand that various modifications and other equivalent embodiments are possible without departing from the essential idea of the present invention as claimed. It should be understood that equivalents include equivalents to be developed in the future as well as currently publicized equivalents—i.e., all components invented to perform the same function regardless of a structure.

What is claimed is:

1. A smart card comprising:
    a dual antenna including a first antenna and a second antenna for performing radio frequency communication with a card reader;
    an IC chip electrically connected to the first antenna to perform radio frequency communication through the first antenna;
    a power generation circuit for generating DC power by converting a radio frequency signal received through the second antenna;
    a controller for receiving the DC power from the power generation circuit to control modules in the smart card; and
    a cut-off circuit arranged between the first antenna and the IC chip to cut off a radio frequency signal received through the first antenna under a control of the controller,
    wherein the cut-off circuit includes:
    a rectifier for rectifying the radio frequency signal received through the first antenna; and
    a switch for connecting an output terminal of the rectifier to a ground according to a control signal from the controller.

2. The smart card according to claim 1, wherein when the control signal is provided at a low level indicating a deactivation state of the IC chip, the switch is turned on.

3. The smart card according to claim 1, wherein when the control signal is provided at a high level indicating an activation state of the IC chip, the switch is turned off.

4. The smart card according to claim 3, wherein when the switch is turned off, the radio frequency signal received through the first antenna is provided to the IC chip, and the radio frequency signal provided to the cut-off circuit is rectified into DC power and cut off from the ground.

5. The smart card according to claim 1, further comprising a built-in battery for storing the DC power generated by the power generation circuit and supplying DC power required for operation of the modules under the control of the controller.

6. The smart card according to claim 1, wherein the modules include one or more among a user interface, a display, a fingerprint recognition module, and a wireless power charging module.

7. A smart card comprising:
    a dual antenna including a first antenna and a second antenna for performing radio frequency communication with a card reader;
    an IC chip electrically connected to the first antenna to perform radio frequency communication through the first antenna;
    a power generation circuit for generating DC power by converting a radio frequency signal received through the second antenna;
    a controller for receiving the DC power from the power generation circuit to control modules in the smart cart; and a cut-off circuit arranged between the first antenna and the IC chip to cut off a radio frequency signal received through the first antenna under a control of the controller, wherein the cut-off circuit includes:

a rectifier for rectifying the radio frequency signal received through the first antenna; and a switch connected to a capacitor to connect the radio frequency signal received through the first antenna to a ground through the capacitor under the control of the controller, and wherein a ground of the rectifier is commonly connected to a ground of the switch and the controller.

* * * * *